United States Patent [19]

Peltier

[11] 4,231,975
[45] Nov. 4, 1980

[54] EVAPORATIVE COOLER AND LIQUID-GAS CONTACT PAD THEREFOR

[76] Inventor: John W. Peltier, 27465 Pacific St., San Bernardino, Calif. 92346

[21] Appl. No.: 79,362

[22] Filed: Sep. 27, 1979

[51] Int. Cl.³ .............................................. B01F 3/04
[52] U.S. Cl. ..................................... 261/99; 261/106; 261/107; 261/112; 261/DIG. 41; 261/DIG. 72; 428/378
[58] Field of Search .................................. 261/94–99, 261/112, 103, DIG. 41, DIG. 46, DIG. 72, 104, 106, 107; 422/310–312; 428/96, 97, 245, 247, 364, 378; 55/524, 527, 528

[56] References Cited

U.S. PATENT DOCUMENTS

| | | | |
|---|---|---|---|
| 1,828,029 | 10/1931 | Marx et al. | 428/378 X |
| 2,072,408 | 3/1937 | Pollak | 428/378 X |
| 2,137,905 | 11/1938 | Church et al. | 261/DIG. 41 |
| 2,168,286 | 8/1939 | Eustis et al. | 428/378 |
| 2,252,157 | 8/1941 | Bergin et al. | 428/378 X |
| 2,553,412 | 5/1951 | Heritage | 428/378 |
| 2,604,311 | 7/1952 | Summerhill | 261/DIG. 72 |
| 2,610,893 | 9/1952 | Collins et al. | 261/DIG. 72 |
| 2,829,732 | 4/1958 | Goettl | 261/DIG. 72 |
| 2,955,064 | 10/1960 | Frohmader | 261/DIG. 72 |
| 3,126,428 | 3/1964 | Ash | 261/DIG. 72 |

FOREIGN PATENT DOCUMENTS 2503681 8/1975 Fed. Rep. of Germany ... 261/DIG. 72

Primary Examiner—Richard L. Chiesa
Attorney, Agent, or Firm—Herbert E. Kidder

[57] ABSTRACT

An evaporative cooler pad consisting of loosely packed, randomly oriented fibers of balsam poplar (Populus tacamahaca) also known as balm of Gilead, which are generally ribbon-shaped and which are coated with a thin layer of Portland cement that is water-absorbent and has a granular surface. Balsam poplar has the unique property of forming a firm, adherent bond to the Portland cement, and the cement-coated ribbons of wood absorb and diffuse moisture over their entire surface in the manner of a blotter, so that they become uniformly damp without being excessively wet. The damp, Portland-cement coated fibers present a large surface area of moisture to the air, thereby facilitating rapid evaporation for good cooling effect, without allowing the air to pick up and carry along any fine droplets of water, which would make it wet. The damp, cement-coated fibers also cool without adding appreciably to the humidity in the air. The pad is relatively rigid and self-supporting, and does not require the usual wire cage that is used to contain aspen excelsior pads.

1 Claim, 5 Drawing Figures

EVAPORATIVE COOLER AND LIQUID-GAS CONTACT PAD THEREFOR

BACKGROUND OF THE INVENTION

The present invention pertains generally to evaporative coolers, and more particularly to a new and unique type of evaporative cooler pad which employs ribbons of wood fibers coated with Portland cement.

Prior art evaporative cooler pads have generally been made of aspen wood excelsior. Aspen wood has a high sugar content, and as a result it supports the growth of bacteria and molds that are carried by the air. Consequently, the cooler pad soon takes on a very objectionable swamp-like odor, and for this reason, aspen excelsior coolers are often termed "Swamp coolers". Another objection to aspen excelsior fiber pads is that they cause the air to become excessively humid, so that although the temperature of the air is reduced, the higher humidity gives it an unpleasant, clammy character. Such excessive humidity is uncomfortable, and the moisture results in rapid rusting of metal objects as well as warping furniture and other metal structures. Moreover, clothing and bedding tend to become damp and uncomfortable.

SUMMARY OF THE INVENTION

The primary object of the present invention is to provide an evaporative cooler pad which overcomes all of the above-named objections, and which combines high efficiency with relatively low addition of humidity to the air that issues from the cooler.

Another object of the invention is to provide an evaporative cooler pad that is virtually permanent and never needs to be replaced.

Another object of the invention is to provide a new and improved pad of the type described which can be installed in existing coolers.

Still a further object of the invention is to provide an evaporative cooler pad that is rigid and self-supporting, and hich is capable of standing on edge with no support from the housing structure.

These and other objects and advantages of the invention will become apparent to those skilled in the art from the following detailed description of the preferred embodiment thereof, with reference to the accompanying drawings.

DESCRIPTION OF THE PREFERRED EMBODIMENT

Figure 1:
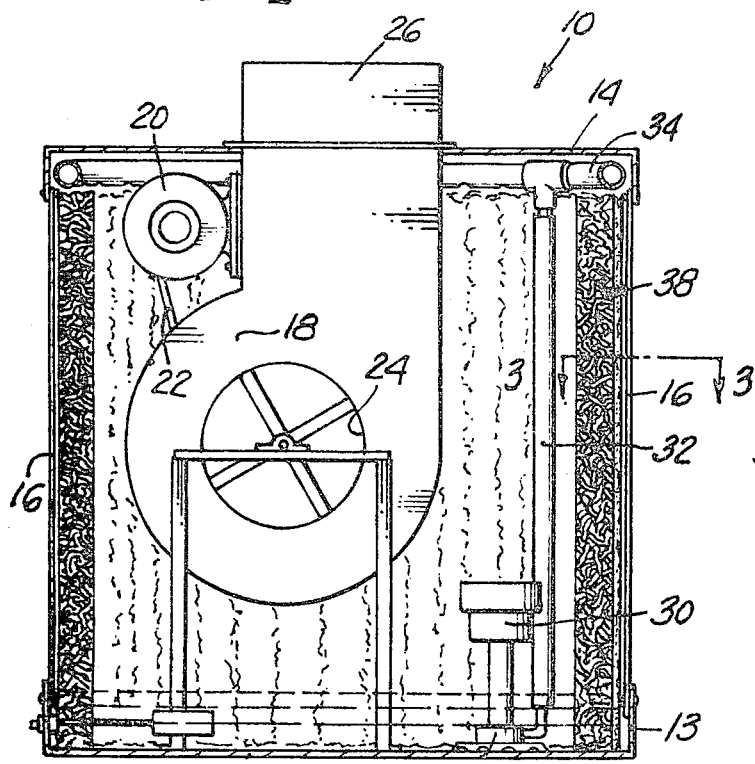
FIG. 1 is a sectional view through a typical evaporative cooler, utilizing the pad of the present invention.
Figure 2:
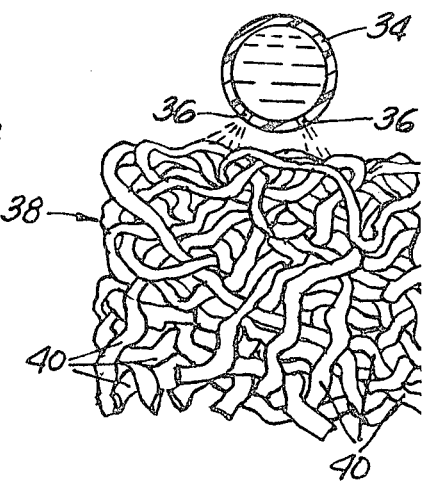
FIG. 2 is an enlarged, fragmentary sectional view through the top edge of the evaporative cooler pad and the water distribution tube directly above it.
Figure 3:
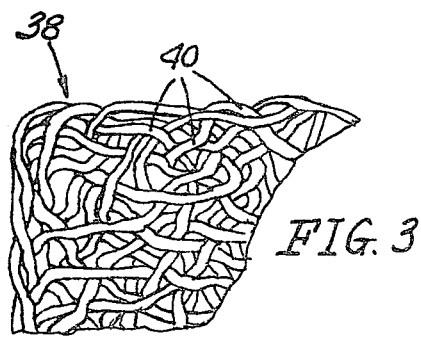
FIG. 3 is an enlarged fragmentary sectional view through the pad, taken at 3—3 in FIG. 1, showing the structure of the same.

In FIG. 1, an evaporative cooler is designated in its entirety by the reference numeral 10, and comprises a generally box-like, rectangular housing, consisting of a base pan 12 having upturned edges 13 around its outer periphery which form a shallow sump, a top lid 14, and vertical posts 16 connecting the base pan to the top lid. Mounted within the housing is a centrifugal blower 18 driven by an electric motor 20 and belt drive 22. The blower 18 has an intake opening 24, and an exhaust duct 26 extending upwardly through an opening in the top lid.

Also mounted in the bottom of the housing sump is a submersible pump 28, driven by an electric motor 30, which discharges water upwardly through a vertical pipe 32 to a horizontal distributor pipe 34 having discharge openings 36 in its bottom that allow water to run down onto the top edge of a pad 38 made in accordance with the invention.

Figure 5:
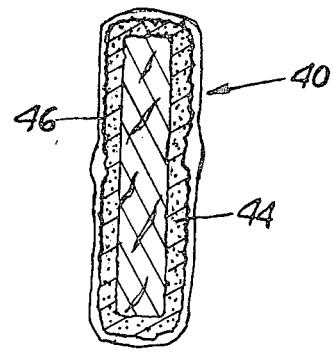
FIG. 5 is a further enlarged, transverse sectional view through the same, taken at 5—5 in FIG. 4.
Figure 4:
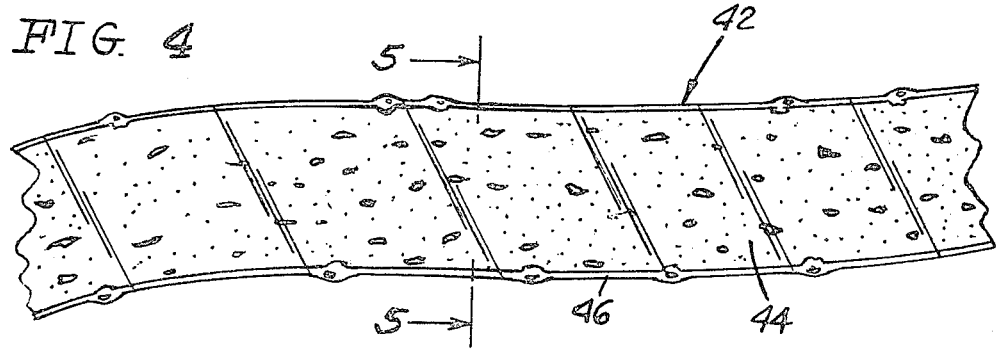
FIG. 4 is a greatly magnified, side elevational view of a short length of ribbon-like wood fiber, coated with Portland cement, in accordance with the invention.

The pad 18 consists of a mat of loosely packed, randomly oriented, ribbon-like strands of wood fiber 40, resembling coarse excelsior. Each of the strands 40 is coated on all sides with a thin, porous, granular skin of Portland cement, which also bonds the strands together wherever they cross one another, forming a rigid, self-supporting structure. The strands of cement-coated wood are spaced apart from one another for the greater part of their respective lengths, forming interstices, or open passageways, through the pad from one side to the other, through which air passes freely. FIGS. 4 and 5, which are greatly magnified views of a single coated strand, show the ribbon-like strand 42 of wood fiber, with its portland cement coating 44.

I have found, in the course of much experimentation and testing, that only one variety of wood can be satisfactorily coated with a long-lasting film of Portland cement, and that variety is balsam poplar (Populus tacamahaca) also known as balm of Gilead. Other woods fail to obtain a lasting, adherent bond with the Portland cement, and after a relatively short time (e.g. 2 or 3 weeks) the cement begins to flake off, and the pad is quickly destroyed by the action of the water as it penetrates the wood and causes it to swell. For some reason balsam poplar forms a tighter, more adherent bond that does not flake off, and evaporative cooler pads made of this wood have been found to last for long periods of time.

The outer surface of the Portland cement coating 44 has a fine-grained, porous granular structure, that produces a strong capillary action on water, causing a thin film 46 of water to adhere to the surface of the coating on all sides. The term "fine-grained" as used herein refers to granular particle sizes of the order of 150 to 250 microns (i.e., the particles will pass a No. 50 sieve and be retained by a No. 100 sieve). The film 46 of water is extremely thin, so that the cement-coated strands appear to be damp, rather than wet. As a result, air drawn through the pad 38 is cooled by the loss of heat to the moisture, as the moisture evaporates, without at the same time picking up an excessive amount of water vapor which would create undesirably high relative humidity. The strands 42 of wood fiber are preferably about $\frac{1}{8}$ inch to 3/16ths inch in width, and approximately 1/32nd inch in thickness. The pad should be at least $2\frac{1}{2}$ inches thick, and when properly made, weighs about 20 lbs. per cubic foot.

The pads 38 are made by immersing a measured quantity of dry wood fiber ribbon excelsior of balsam poplar in a thin slurry of Portland cement and water. The slurry may be made by adding 5 gallons of water to a sack of cement, which makes a rather thin slurry. After thoroughly mixing the wood strand excelsior in the cement slurry, the excess slurry is allowed to drain off and the pad is placed in a form to cure. To prevent the cement slurry from draining off the wood strands during the initial period immediately after immersion, a small amount (e.g. about 10% by weight of the cement) of thickening material such as pozzolan or fly ash acts as a thixotropic agent, causing the slurry to cling to the wood strands without draining off. The total cure time is about 12 days. Approximately 24 hours after coating the wood strands, the pad is covered with blankets and kept moist for the remainder of the 12 days.

The operation of the evaporative cooler of FIG. 1 is believed to be clear from the foregoing description. Water running down through the pad 38 causes the cement coating to become damp, and as air is drawn through the pad, moisture is evaporated, taking up the latent heat of the water from the air and cooling the latter. The cement coating 44 causes the moisture to be dispersed over the surface of the strands in a uniform, microscopic film that provides the necessary moisture without the excessive wetness that is obtained with ordinary aspen excelsior. As a result, the cooled air issuing from the evaporative cooler has a lower relative humidity than the air coming from a conventional aspen excelsior cooler under identical conditions.

In tests run under identical conditions, a cooler using the cement coated strands of the present invention reduced the temperature of ambient air from 105° F. and 15% relative humidity to 70° F. and 41% relative humidity. A conventional cooler pad using aspen excelsior reduced the same 105° F. and 15% relative humidity to 74° F. and 50% relative humidity. The 9% difference in relative humidity makes a substantial difference in the comfort of the cooled air.

While I have shown and described in considerable detail what I believe to be the preferred form of my invention, it will be understood by those skilled in the art that the invention is not limited by such details, but may take various other forms within the scope of the claims.

What I claim is:

1. An evaporative cooler pad comprising:

a pad of loosely packed, randomly oriented, ribbon-like wood fiber strands of balsam poplar (Populus tacamahaca) having a thin layer of Portland cement surrounding and enclosing each strand;

said strands being separated from one another along the greater part of their respective lengths, forming interconnecting interstices, or passageways, from one side of the pad to the other, whereby air is allowed to flow freely through the pad;

said pad being dampened by water that is discharged onto the top part and allowed to flow by gravity down to the bottom of the pad, while air is drawn through said interstices and passageways from one side of the pad to the other;

the cement coating on each of said strands having a fine-grained, granular surface that is porous and produces a strong capillary action on water, causing a thin film of moisture to adhere to the surface of the coating, whereby a minimum of water provides a maximum area of moist surface to be cooled by evaporation, with a minimum increase in relative humidity of the air passing through the pad.

* * * * *